March 22, 1932. H. A. WINTER 1,850,367
CHAIN RUN FOR VEHICLES
Filed Oct. 6, 1931
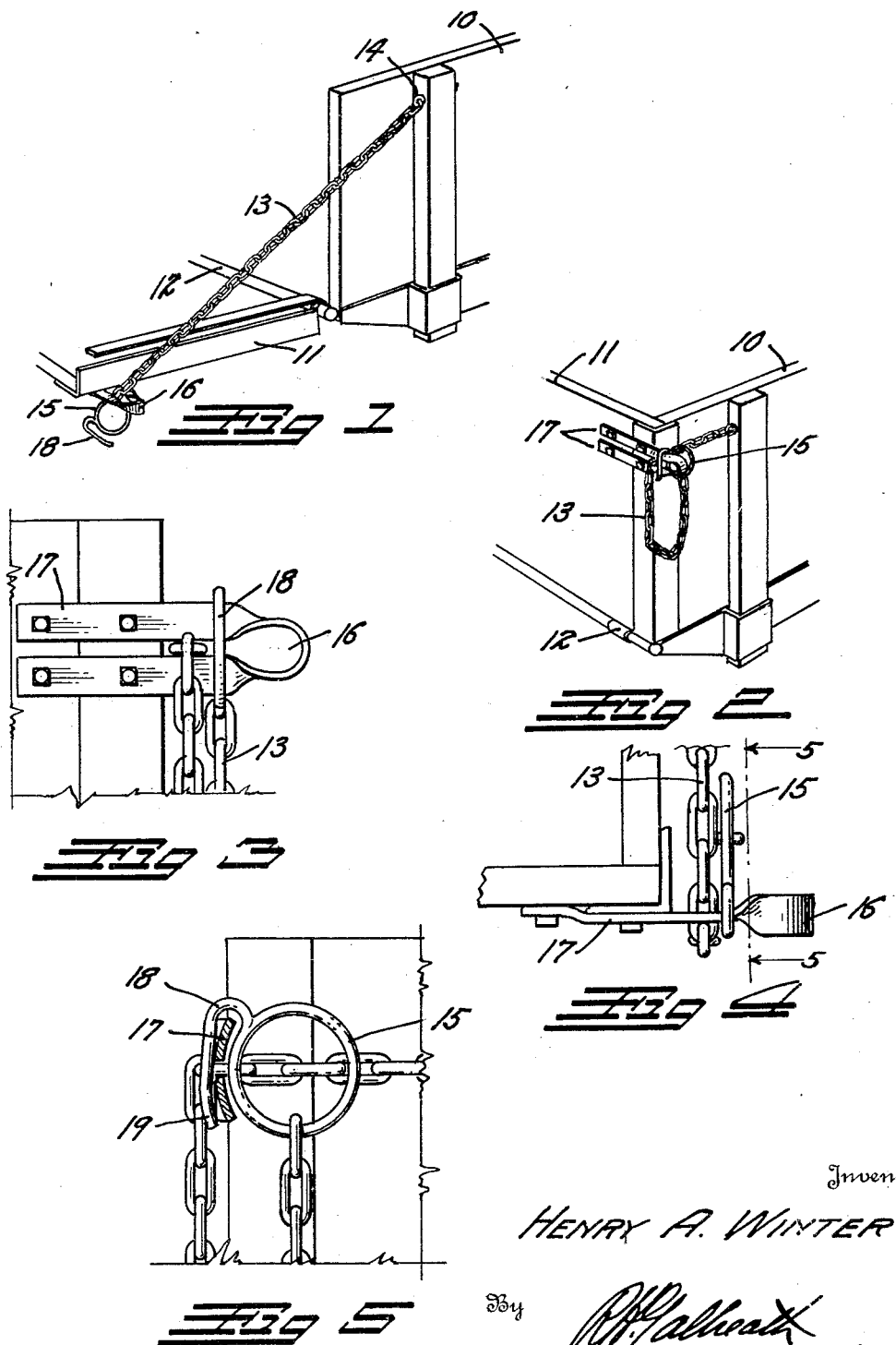
Inventor
HENRY A. WINTER
By
Attorney Patented Mar. 22, 1932

1,850,367

UNITED STATES PATENT OFFICE

HENRY A. WINTER, OF DENVER, COLORADO

CHAIN RUN FOR VEHICLES

Application filed October 6, 1931. Serial No. 567,145.

This invention relates to what is generally known in the vehicle body art as a "chain run", that is, a chain and fittings therefor, which is used for supporting either the side boards or tail board of a vehicle body in the vertical, or horizontal or any intermediate position.

The principal object of the invention is to provide fixtures for a chain of this character which will securely lock the chain in place at any desired point; which can be cheaply and easily manufactured; and which will allow the chain to be instantly and securely adjusted, without danger of being shaken from place by the vibration of the vehicle.

Other objects and advantages reside in the detail construction of the invention, which is designed for simplicity, economy, and efficiency. These will become more apparent from the following description.

In the following detailed description of the invention reference is had to the accompanying drawings which form a part hereof. Like numerals refer to like parts in all views of the drawings and throughout the description.

In the drawings:

Fig. 1 is a fragmentary perspective view illustrating the improved chain run supporting a vehicle body side board in the extended position.

Fig. 2 is a similar view illustrating the side board in the closed position.

Fig. 3 is a detail rear elevation of the device in the closed position.

Fig. 4 is a similar detail plan view thereof.

Fig. 5 is a cross section taken on the line 5—5, Fig. 4.

In the drawings a tail board of a typical vehicle body of the type employed for beet hauling and the like, is indicated at 10, the side board at 11, and the side board hinge at 12. 13 indicates a chain which may be secured in any desired manner to the tail board or any other part of the vehicle such as illustrated by the eye bolt 14.

The free extremity of the chain is secured to a ring 15. The chain passes through a loop 16 formed in a bent, flat, metal bar 17, which may be secured to the side board 11 so as to project there beyond as illustrated. The ring 15 prevents the chain from passing entirely through the loop 16.

It will be noted that the loop is formed by twisting the mid-portion of the bar 17 at right angles to the end portions and then bending the twisted or lateral portion to form a loop so that the two extremities will lie parallel in a common plane and in spaced apart relation, as indicated in Fig. 3. The width of the narrowed portion, that is, the distance between the two parallel extremities, is such that one of the chain links can pass edgewise therein but not crosswise therethrough.

When the side board is closed, or is in any position other than fully open, one of the links of the chain 13 is passed between the parallel extremities of the bar 17 causing the next link to act as a stop to support the side board. The chain is held in place between the extremities by means of a hook 18 which is formed on and forms a part of the ring 15.

It is desired to call particular attention to the secure lock afforded by the hook 18. This is brought out more clearly in Fig. 5. It will be noted that the twisted portions of the bar 17 form a slight concavity for receiving the annular edge of the ring 15. It will also be noted that the lower extremity of the hook 18 is turned inwardly slightly as shown at 19 to conform to this curvature. This makes it impossible for the hook to shake or jar from place unless it is turned and guided by the operator's hand from the concavity. It cannot be lifted straight up as any upward movement simply acts to lock it more firmly in place. It must be turned or rotated about the axis of the ring in order to release it. The weight of the chain hanging from the hook 18 serves further to lock it and maintain it in position.

It is desired to call attention to the facility and ease with which the invention may be used. Let us suppose the operator desires to drop the side board 10. He simply turns the hook 18 from place by means of the ring 15 and pulls the chain 13 into the loop 16. This frees the side board so that it may be lowered to any desired position. Let us assume that he desires to lock the side board closed. He lifts the board and pushes it to the closed position and pulls the chain between the extremities 17 and then turns the hook 18 in place. The entire operation of the chain can be easily done with one hand while the other is used to support the side board.

While a specific form of the improvement has been described and illustrated herein, it is desired to be understood that the same may be varied within the scope of the appended claims, without departing from the spirit of the invention.

Having thus described the invention, what is claimed and desired secured by Letters Patent is:

1. A device for supporting a hinged member on a vehicle body comprising: a looped member, the extremities of which are adapted to be secured to said hinged member with the loop projecting therebeyond; a chain passing through said loop and secured to said vehicle body at its one extremity; a ring on the opposite extremity of said chain preventing said latter extremity from passing through said loop; a narrowed portion formed in said loop so as to receive a chain link edgewise but prevent its passage crosswise; and a hook member adapted to be hooked over said looped member for maintaining said chain in said narrowed portion.

2. A device for the purpose set forth comprising: a relatively long, flat bar; a mid-portion in said bar turned at right angles to the surface of the extremities thereof; a loop formed in said mid-portion so as to bring said extremities edge to edge in spaced apart relation; a chain passing through said looped portion; and means for holding a link of said chain between said spaced apart extremities.

3. A device for the purpose set forth comprising: a relatively long, flat bar; a mid-portion in said bar turned at right angles to the surface of the extremities thereof; a loop formed in said mid-portion so as to bring said extremities edge to edge in spaced apart relation; a chain passing through said looped portion; means for holding a link of said chain between said space apart extremities, said means comprising, a hook secured to one end of said chain and adapted to pass over said extremities.

4. A device for the purpose set forth comprising: a relatively long, flat bar; a mid-portion in said bar turned at right angles to the surface of the extremities thereof; a loop formed in said mid-portion so as to bring said extremities edge to edge in spaced apart relation; a chain passing through said looped portion; means for holding a link of said chain between said spaced apart extremities, said means comprising, a ring secured to one extremity of said chain; and a hook projecting from said ring, said hook being arranged to pass over the extremities of said bar adjacent said loop.

5. A device for the purpose set forth comprising: a relatively long, flat bar; a mid-portion in said bar turned at right angles to the surface of the extremities thereof; a loop formed in said mid-portion so as to bring said extremities edge to edge in spaced apart relation; a chain passing through said looped portion; means for holding a link of said chain between said spaced apart extremities, said means comprising a ring secured to one extremity of said chain; a hook projecting from said ring, said hook being arranged to pass over the extremities of said bar adjacent said loop, said bar being twisted adjacent the position of said ring so as to form a concavity for the reception of the latter.

6. A device for the purpose set forth comprising; a relatively long, flat bar; a mid-portion in said bar turned at right angles to the surface of the extremities thereof; a loop formed in said mid-portion so as to bring said extremities edge to edge in spaced apart relation; a chain passing through said looped portion; means for holding a link of said chain between said spaced apart extremities, said means comprising, a ring secured to one extremity of said chain; a hook projecting from said ring, said hook being arranged to pass over the extremities of said bar adjacent said loop, said bar being twisted adjacent the position of said ring so as to form a concavity for the reception of the latter; and an inwardly turned extremity on said hook substantially conforming to the contour of said ring.

In testimony whereof, I affix my signature.

HENRY A. WINTER.